US008732674B1

(12) United States Patent
Agha

(10) Patent No.: US 8,732,674 B1
(45) Date of Patent: May 20, 2014

(54) REVERTABLE MANAGED EXECUTION IMAGE INSTRUMENTATION

(71) Applicant: Microsoft Corporation, Redmond, WA (US)

(72) Inventor: Karim Agha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 15 days.

(21) Appl. No.: 13/676,189

(22) Filed: Nov. 14, 2012

(51) Int. Cl.
*G06F 9/44* (2006.01)

(52) U.S. Cl.
USPC ............ 717/130; 717/131; 717/139; 717/140; 717/153; 717/168

(58) Field of Classification Search
None
See application file for complete search history.

(56) References Cited

U.S. PATENT DOCUMENTS

| 5,113,494 | A | * | 5/1992 | Menendez et al. | 345/502 |
|---|---|---|---|---|---|
| 5,671,416 | A | * | 9/1997 | Elson | 717/106 |
| 5,752,034 | A | * | 5/1998 | Srivastava et al. | 717/130 |
| 5,850,550 | A | * | 12/1998 | Li et al. | 717/154 |
| 5,870,545 | A | * | 2/1999 | Davis et al. | 709/201 |
| 5,872,973 | A | | 2/1999 | Mitchell et al. | |
| 5,920,716 | A | * | 7/1999 | Johnson et al. | 717/141 |
| 5,963,740 | A | * | 10/1999 | Srivastava et al. | 717/130 |
| 6,044,216 | A | * | 3/2000 | Bhargava et al. | 717/114 |
| 6,063,133 | A | * | 5/2000 | Li et al. | 717/136 |
| 6,430,741 | B1 | * | 8/2002 | Mattson et al. | 717/154 |
| 7,219,341 | B2 | | 5/2007 | Dalton et al. | |
| 7,424,705 | B2 | | 9/2008 | Lewis et al. | |
| 7,788,731 | B2 | | 8/2010 | Morris et al. | |
| 2008/0209525 | A1 | * | 8/2008 | Ben-Shoshan | 726/4 |
| 2009/0037895 | A1 | | 2/2009 | Le Roy | |
| 2011/0307858 | A1 | | 12/2011 | Biswas et al. | |

OTHER PUBLICATIONS

Biswas, Surupa, "The Performance Benefits of NGen", Retrieved at <<http://msdn.microsoft.com/en-us/magazine/cc163610.aspx>>, Retrieved Date: Sep. 27, 2012, pp. 8.
Meier, et al, "Chapter 7 Building Secure Assemblies", Retrieved at <<http://msdn.microsoft.com/en-us/library/ff648656.aspx>>, Jun. 2003, pp. 28.
Jay Hilyard, "No Code Can Hide from the Profiling API in the .NET Framework 2.0", Retrieved at <<http://msdn.microsoft.com/en-us/magazine/cc300553.aspx>>, Jan. 2005, pp. 11.

(Continued)

*Primary Examiner* — Chameli Das
(74) *Attorney, Agent, or Firm* — Ben Tabor; Kate Drakos; Micky Minhas

(57) ABSTRACT

A target program is instrumented during execution by using statements in high-level programming languages, without restarting the target and without modifying the compiled binary of the target on disk. The target and the analysis program modifying it may each include managed code. The target program is presented by an instrumentation API as a queryable database, rather than a mere sequence of processor-level instructions. An instrumentation context for the target program's execution image is obtained, with identifications of functions, individual instructions, and other instrumentable items that satisfy criteria specified in a query. Functions and low-level instructions may be identified as satisfying the query regardless of whether they have executed yet. High-level statements transform query-satisfying items in the target's execution image, by appending code, injecting a fault, replacing an individual instruction, or replacing an individual operand. Instrumentation transformations may be reverted without restarting execution and without reverting to the pre-execution image.

20 Claims, 3 Drawing Sheets

(56) References Cited

OTHER PUBLICATIONS

Amitabh Srivastava et al., "Vulcan: Binary transformation in a distributed environment", Retrieved at <<research.microsoft.com/pubs/69850/tr-2001-50.pdf>>, Apr. 20, 2001, pp. 12.

"Binary Technologies Projects", Retrieved at <<http://www.microsoft.com/windows/cse/bit_projects.mspx>>, copyright date 2012, 1 page.

"Detours", Retrieved at <<http://www.microsoft.com/about/legal/en/us/intellectualproperty/iplicensing/programs/detours.aspx>>, copyright date 2012, pp. 2.

* cited by examiner

US 8,732,674 B1

REVERTABLE MANAGED EXECUTION IMAGE INSTRUMENTATION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A large gap exists between technology designs that are readily understood by people, on the one hand, and working computational technology implementations, on the other. People are most comfortable and fluent with natural languages and visual descriptions in a product design, whereas computational technology is ultimately implemented as bits flowing through circuits. Over several decades the gap between design and implementation has been bridged by using high-level programming languages and their development environments. A software product development cycle generally includes a high-level design, which guides developers in writing software in one or more high-level programming languages, which is then compiled into lower level instructions (possibly by way of intermediate code such as bytecode or assembly language) until instructions are generated that can be executed (possibly after suitable linking and loading operations) by a computing system.

Changing the lower-level instructions poses technical challenges, but some mechanisms do exist to modify lower-level instructions in some ways. For example, one may dynamically load additional instructions through a plug-in or a dynamically loaded library, and one may modify jump tables to swap one function for another as the destination of a function call. Debuggers and profilers insert instructions along a program's execution path to halt execution, or to log when a particular piece of code is executed, for example. Tools may also be used to patch a binary file before it is loaded for execution. Some relatively simple programs also contain self-modifying code. Some types of malware produce copies of themselves as an effect of their execution. Sometimes changes to low-level instructions are undesirable, as when bugs or malware cause bits to be written at memory locations that were not intended for that purpose by the original software's developer.

However, the most widely used and typical approach used to legitimately modify the low-level instructions of a software program is to edit the program's source code. The altered source code is then recompiled to generate modified low-level instructions, so the changes in program functionality caused by the source code edits will occur the next time the program is executed.

SUMMARY

Some embodiments are directed to the technical problem of changing the processor-level instructions of a software program, and more specifically to the technical challenge of changing processor-level instructions without editing and recompiling source code. As used herein, "processor-level instructions" are instructions at the virtual machine level (e.g., bytecode, Common Language Runtime instructions, Microsoft Intermediate Language (MSIL) instructions), and/or instructions at the assembly language level (e.g., x86, x64, ARM CPU assembly instructions), and/or instructions at an even lower level (e.g., firmware, machine language). Some embodiments are also directed to related technical problems, such as the problem of changing processor-level instructions of a program while the program is running, and/or the problem of changing processor-level instructions of a program that was loaded from a binary file on a disk without also modifying that binary file.

Some embodiments facilitate instrumentation of a software program during an execution of the software program. Program execution is performed by a machine having a processor and a memory in operable communication with the processor. The software program has a digital execution image which is being executed by the machine along an execution path. The software program also has a pre-execution image which is stored in a computer-readable storage location apart from the execution image. For example, the pre-execution image may be stored on disk in a filesystem controlled by a developer, whereas the execution image is stored in RAM (pages of RAM may be stored from time to time on another portion of the disk, which is controlled by a virtual memory manager).

Some embodiments obtain in the machine memory an instrumentation context for the software program's execution image. Obtaining the context includes the machine executing at least one high-level programming language statement.

In some embodiments, the instrumentation context includes a set of function identifications which identify at least one function from the execution image which is in the execution path and also identify at least one other function from the execution image which is not in the execution path. In some embodiments, the instrumentation context includes identification of one or more other items, such as individual instruction identifications as opposed to function identifications.

Some embodiments query the instrumentation context using a high-level programming language query which specifies at least one query criterion to be satisfied. A query criterion may be a Boolean combination of constituent query criteria. In some embodiments, the query includes a declarative Language Integrated Query expression.

Some embodiments receive in the machine memory a query response which identifies one or more functions and/or other items in the program's execution image that satisfy the query. In some cases, the query response identifies every item in the program's execution image that satisfies the query, while in other cases only a proper subset of those items is identified. In some embodiments, functions and low-level instructions may be identified as satisfying the query regardless of whether those items have executed yet during the current execution of the program. These one or more identified items are referred to here as query-satisfying items, and satisfactory functions in particular are referred to as query-satisfying functions. In some embodiments, the query-satisfying item includes a bytecode instruction, a Common Intermediate Language instruction, or a low-level virtual machine instruction, for example.

Some embodiments transform a function body of at least one query-satisfying function in the program's execution image, and some do so without thereby modifying the program's pre-execution image. Some embodiments transform at least one query-satisfying item in the program's execution image in a manner that alters a functionality aspect of the execution image. That is, execution of the transformed item provides different functionality than would be provided by execution of the item without first transforming the item.

Sometimes every query-satisfying item in the program's execution image is transformed, while in other cases only some of the query-satisfying items are transformed.

To perform a transformation, some embodiments append code at the beginning of at least one query-satisfying function, some append code at the end of at least one query-satisfying function, and some inject a fault in at least one query-satisfying function. Some embodiments replace at most N individual instructions of the query-satisfying function without replacing the entire function (where N=1, 2, 3, 4, 5, or another predetermined value), and some replace one or more operands of at most N individual instructions of the query-satisfying function without replacing the entire function. Some embodiments replace an individual low-level instruction without replacing any adjacent low-level instruction and without replacing any operand of any adjacent low-level instruction; some replace at least one operand of an individual low-level instruction without replacing any adjacent low-level instruction and without replacing any operand of any adjacent low-level instruction.

Some embodiments revert transformation of at least one query-satisfying function without restarting execution of the software program. Some revert transformation of at least one query-satisfying function without reverting the program's execution image to the program's pre-execution image. Some do both—they revert the transformation without restarting execution and also without reverting to the pre-execution image.

From an architectural perspective, some embodiments provide an instrumentation architecture which includes a logical processor, a memory in operable communication with the logical processor, a current execution image of a software program, and an instrumentation application program interface ("instrumentation API").

In some embodiments, the execution image is an image of the software program as the software program is being executed by the instrumentation computer system during a current execution, and the software program also has a separate pre-execution image. Prior to any instrumentation through the API, the execution image is a copy of the pre-execution image except for the address updates and other familiar operations involved in linking and loading an image to be executed. In some cases, the execution image includes managed code, e.g., code in which garbage collection is automatically managed by a runtime using compiler-generated mechanisms in the managed code. A pre-execution image may include, for example, one or more signed assemblies and/or one or more unsigned assemblies. Thus, an execution image can be transformed without invalidating the signed assemblies from which the execution image was derived prior to the transformation.

In some embodiments, the instrumentation API resides in the memory and is directly accessible in a high-level programming language. For example, the high-level programming language may be a programming language which compiles to bytecode, a Common Language Infrastructure programming language, and/or a programming language which is not compiled directly to native processor instructions.

In some embodiments, the instrumentation API has constituent interfaces which include a query interface and a transformation interface. The query interface has a query interface implementation with code which upon execution will identify query-satisfying items in the execution image, namely, items which satisfy query criteria set forth in an invocation of the query interface regardless of whether such items have been executed during the current execution of the program. The transformation interface has a transformation interface implementation with code which upon execution will transform an item identified by the query interface implementation. Such transformation alters functionality of the current execution image in that execution of the transformed item (routine, instruction) provides different functionality than the functionality that would be provided by execution of the item without transforming the item.

For example, in some embodiments the transformation interface implementation includes code which upon execution will do at least one of the following: append code at the beginning of at least one query-satisfying function of the execution image; append code at the end of at least one query-satisfying function of the execution image; inject a fault in at least one query-satisfying function of the execution image; replace an individual low-level instruction of the execution image without replacing any adjacent low-level instruction and without replacing any operand of any adjacent low-level instruction; replace at least one operand of an individual low-level instruction of the execution image without replacing any adjacent low-level instruction and without replacing any operand of any adjacent low-level instruction. In some cases, a query-satisfying item is transformed by the architecture without modifying the pre-execution image. In some cases, the pre-execution image is modified but that modification is not a prerequisite of the execution image transformation.

In some embodiments, transformations are revertable, i.e., they can be undone to restore the execution image to the same functionality it had prior to the transformation. The exact binary content of a reverted execution image is not necessarily restored (although in some embodiments it is), but the functionality (e.g., "black box" impact on variables and peripheral devices) is restored. In some cases, the transformation interface implementation code reverts transformation of at least one query-satisfying item without restarting execution of the software program. In some, transformation interface implementation code reverts transformation of at least one query-satisfying item without reverting the program's execution image to the program's pre-execution image.

In some embodiments, the memory of the instrumentation computer system contains a query response which identifies every item in the program's execution image that satisfies the query criteria (a sequence of coordinated query responses may be treated as a single query response). In some embodiments, transformation interface implementation code transforms every query-satisfying item in the program's execution image.

In some embodiments, the memory of the instrumentation architecture contains an instrumentation context for a current execution image, and the instrumentation context identifies at least one query-satisfying function which has not been executed during the current execution. Thus, instrumentation with the present architecture is not necessarily limited to items lying within a current execution path, unlike some (if not all) debugger instrumentation approaches.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
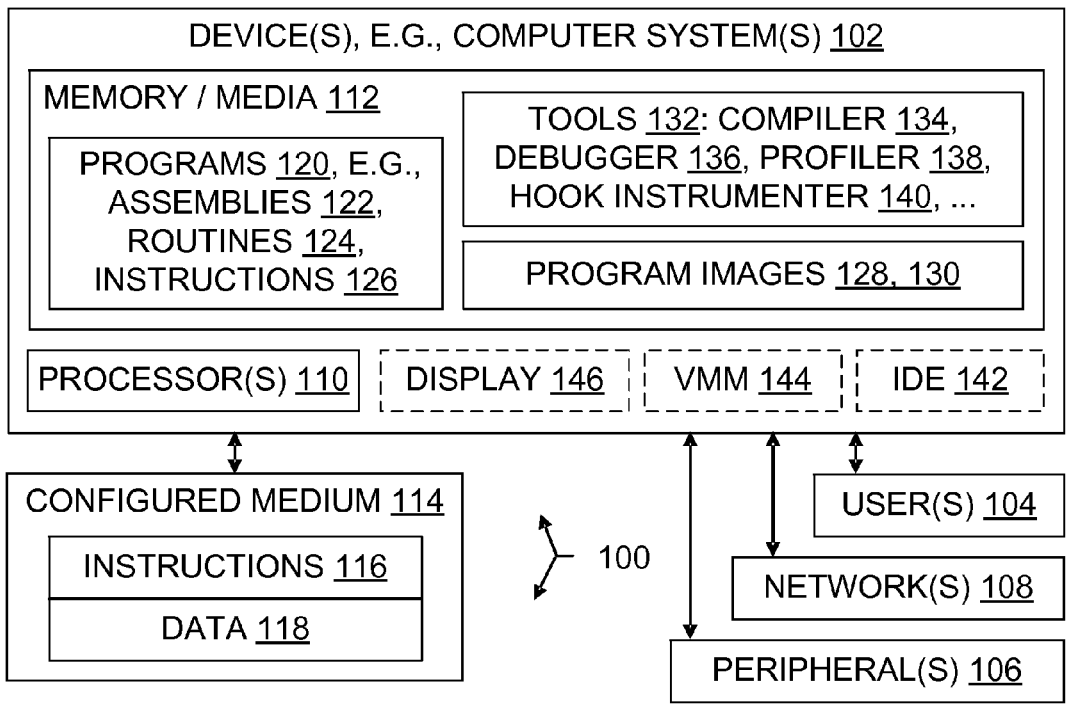
FIG. 1 is a block diagram illustrating a computer system having at least one processor and at least one memory which interact with one another under the control of software for program instrumentation, and other items in an operating environment which may be present on multiple network nodes, and also illustrating configured storage medium (as opposed to a mere signal) embodiments.

Some familiar approaches for modifying the code of compiled managed applications force a user to modify the application's assemblies on disk. This invalidates the assembly signature(s), which prevents the modified assemblies from passing strong-name validation tests. Some other familiar approaches for modifying process code are very complicated from a user's perspective, require thorough knowledge about Common Language Runtime internals, and/or are not reusable outside their target application. Additionally, once an assembly is modified, some if not all familiar approaches do not support reverting any modifications without restarting the process or reverting assemblies to their original versions on disk. Familiar approaches also fail to permit modification scenarios to be performed from within another managed application using constructs such as Language Independent Query (LINQ) syntax, lambda expressions, or specification of the alternative logic as non-compiled C# code.

Some embodiments described herein provide better approaches for modifying run-time processes, that is, for modifying an executable image of a software program. For example, some embodiments represent a running process as a queryable database rather than presenting the familiar view of a process as an enormous sequence of assembly instructions without context. Some embodiments allow a user to specify what item(s) are to be instrumented in the running target application through a declarative LINQ query, for instance. This queryable presentation allows a user to treat a target application's codebase as a database, providing the technical advantage of relatively easy filtering to locate item(s) to be modified during runtime.

Some embodiments instrument a running process via high-level programming syntax (e.g., C# syntax), rather than using debugger commands or a reverse-engineered assembly. Some provide the technical advantages of faster debugging and development by applying and reverting any modifications to the target application without restarting its process. This allows a user to change the methods, inputs, and control flow for a running process using familiar high-level code statements. Some embodiments avoid any permanent modifications to the program files on disk that would invalidate their signature or require recompiling program code. Some embodiments can revert any applied modifications during runtime, without restarting the targeted process.

Some embodiments described herein provide an instrumentation framework that is attachable to any managed process started with appropriate environment variables (e.g., COR_ENABLE_PROFILING and COR_PROFILER in a Microsoft®.NET environment (mark of Microsoft Corporation)). This instrumentation framework allows its users to query the running process through an abstracted interface for what they want to modify, using a declarative query syntax, and to then specify how they want to modify items that match the issued query criteria. These capabilities are exposed as a set of C# application program interfaces (APIs). Note that one or more APIs may also be viewed in combination as a single API herein, since the allocation of specified capabilities among one or more interfaces is often an implementation choice.

Some embodiments described herein may be viewed in a broader context. For instance, concepts such as application program interfaces, code modification, high-level programming languages, and queries may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving application program interfaces, code modification, high-level programming languages, and/or queries are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as modifying a program's code during execution of the code, avoiding recompilation, and avoiding signature invalidation. Second, some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein treat running code as a queryable database, and some modify running code. Third, technical effects provided by some embodiments include transformed functions and/or transformed individual processor-level instructions of a running program. Fourth, some embodiments include technical adaptations such as high-level programming language statements for querying an execution image, and for transforming items in the execution image. Fifth, some embodiments modify technical functionality of running code by transformations based on technical considerations such as regular expression matching, fault injection, and/or the separation of execution images from their pre-execution images. Sixth, some embodiments apply an abstract idea (transformation) in a technical manner by transforming only query-satisfying items, or by reverting transformed items without restarting program execution. Seventh, technical advantages of some embodiments include improved usability of development environments and debugging tools, increased reliability of code through removal of bugs found via transformation of query-satisfying items, and simplified development by making transformation of selected items available via high-level programming language statements. Eight, some embodiments apply concrete technical means such as instrumentation contexts in order to obtain particular technical effects such as transformed items, directed to the specific technical problem of modifying code while it runs and without restarting it or invalidating signed assemblies, thereby providing a concrete and useful technical solution.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "function" refers to routines generally. A function may return a value when invoked, but it may also be invoked merely for side-effects. Functions are sometimes also referred to as procedures or methods.

Some embodiments described herein facilitate instrumentation of a software program. As used herein, "instrumentation" refers to any change in the processor-level instructions of the software program. In a particular case instrumentation could include adding one or more instructions, altering instruction location(s), altering instruction operand(s), or replacing one or more instructions with other instruction(s), for example. Injecting a fault (e.g., a HALT instruction, intentional overflow, intentional division by zero, intentional reference through null or another invalid address, or intentional inversion of a branch condition) into the processor-level instructions of a program is also an example of instrumentation of the program.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Likewise, the technical effect of altering program functionality without altering program source code is provided by technical components which include a processor and a memory interacting with instrumentation API software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, altering, appending, executing, identifying, including, injecting, invalidating, invoking, modifying, obtaining, providing, querying, receiving, replacing, reverting, satisfying, specifying, storing, transforming (and accesses, accessed, alters, altered, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. A memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server 102 (mark of Microsoft Corporation). The game may be purchased from a console and it may be executed in whole or in part on the server, on the console, or both. Multiple users 104 may interact with the game using standard controllers, air gestures, voice, or using a companion device such as a smartphone or a tablet. A given operating environment 100 includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media (as opposed to merely a propagated signal). In particular, a configured medium 114 such as a CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors 110 in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more programs 120 have code such as assemblies 122, routines 124, and processor-level instructions 126 which are organized in ways familiar in the art (e.g., instructions 126 are in routines 124 which are in assemblies 122). Programs 120 are stored on disk or other non-volatile memory devices in pre-execution images 128, and are stored while running in volatile memory devices in execution images 130. Software development tools 132 such as compilers 134, debuggers 136, profilers 138, and hook instrumenters 140 assist with software development by producing and/or altering code 120. Hook instrumenters 140 instrument code by altering jump tables, interrupt vectors, and/or other control flow hooks.

A given operating environment 100 may include an Integrated Development Environment (IDE) 142 which provides a developer with a set of coordinated software development tools 132 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

The images 128, 130, tools 132, and other items shown in the Figures and/or discussed in the text may each reside partially or entirely within one or more hardware media 112, thereby configuring those media for technical effects which go beyond the "normal" (i.e., least common denominator)

interactions inherent in all hardware-software cooperative operation. Items which reside generally in volatile memory such as RAM during their use may also be swapped to non-volatile memory such as a hard disk by a virtual memory manager 144. In addition to processors 110 (CPUs, ALUs, FPUs, and/or GPUs), memory/storage media 112, display(s) 146, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
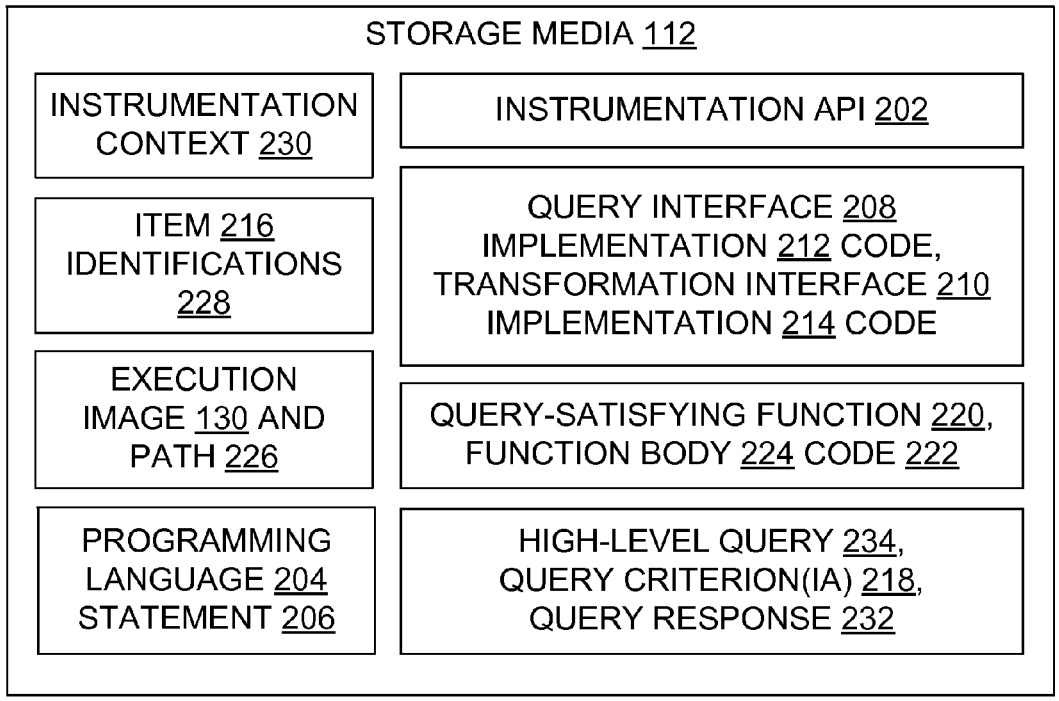
FIG. 2 is a block diagram illustrating aspects of revertable managed execution image instrumentation in an example architecture.

FIG. 2 further illustrates aspects of an architecture which is suitable for use with some embodiments. In particular, some embodiments provide an instrumentation architecture which includes a logical processor 110, a memory 112 in operable communication with the logical processor, a current execution image 130 of a software program, and an instrumentation application program interface ("instrumentation API") 202.

In some embodiments, the execution image 130 is an image of a software program 120 as the software program is being executed by the instrumentation computer system 102 during a current execution; the software program also has a separate pre-execution image 128. Before instrumentation through the API 202, the execution image 130 is a copy of the pre-execution image 128, except for the address updates and other familiar operations involved in linking and loading an image to be executed.

In some cases, the execution image 130 includes managed code, e.g., code in which garbage collection is automatically managed by a runtime using compiler-generated mechanisms in the managed code. For example, managed code 120 in a Microsoft®.NET environment (marks of Microsoft Corporation) may serve as part or all of a program 120.

A pre-execution image 128 may include, for example, one or more signed assemblies and/or one or more unsigned assemblies. Thus, an execution image 130 can be transformed as described herein without invalidating the signed assemblies of the pre-execution image 128 from which the execution image 130 was derived prior to the transformation.

In some embodiments, the instrumentation API 202 resides in the memory and is directly accessible in a high-level programming language 204 such as C#. More generally, the high-level programming language 204 whose statements 206 invoke the API 202 may be a programming language which compiles to bytecode, and/or a Common Language Infrastructure programming language, and/or a programming language which is not compiled directly to native processor instructions.

In some embodiments, the instrumentation API 202 has constituent interfaces which include a query interface 208 and a transformation interface 210. The query interface 208 has a query interface implementation 212 with code which upon execution will identify query-satisfying items in the execution image 130, namely, items 216 which satisfy query criteria 218 set forth in an invocation of the query interface 208 regardless of whether such items have been executed during a current execution path 226 of the program 120. The transformation interface 210 has a transformation interface implementation 214 with code which upon execution will transform an item 216 identified by the query interface implementation. Such transformation alters functionality of the current execution image 130 in that execution of the transformed item (routine 220, instruction 126) provides different functionality than the functionality that would be provided by execution of the item without transforming the item. Items 216 may be identified by name, code listing, and/or other identification 228 in an instrumentation context 230 obtained through the API 202 as a response 232 to a query 234 in a high-level programming language 204.

For example, in some embodiments the transformation interface implementation 214 includes code which upon execution will do at least one of the following: append code 222 at the beginning of a body 224 at least one query-satisfying function 220 of the execution image; append code 222 at the end of the body 224 at least one query-satisfying function 220 of the execution image 130; inject a fault 326 in at least one query-satisfying function of the execution image; replace an individual low-level instruction 126 of the execution image without replacing any adjacent low-level instruction and without replacing any operand 328 of any adjacent low-level instruction; replace at least one operand 328 of an individual low-level instruction 126 of the execution image 130 without replacing any adjacent low-level instruction and without replacing any operand of any adjacent low-level instruction. In some cases, a query-satisfying item 216 (routine 220 or instruction 126) is transformed by the architecture without modifying the pre-execution image 128. In some cases, the pre-execution image is modified, but that modification is not a prerequisite to the execution image transformation.

In some embodiments, transformations are revertable, i.e., they can be undone to restore the execution image 130 to the same functionality it had prior to the transformation. The exact binary content of a reverted execution image is not necessarily restored, but the functionality (e.g., "black box" impact on variables and peripheral devices) is restored. In some cases, the transformation interface implementation 214 reverts transformation of at least one query-satisfying item 216 without restarting execution of the software program 120. In some, the transformation interface implementation 214 reverts transformation of at least one query-satisfying item 216 without reverting the program's execution image 130 to the program's pre-execution image 128.

In some embodiments, the memory of the instrumentation computer system contains a query response 232 which identifies every item 216 in the program's execution image that satisfies the query criteria 218; a sequence of coordinated query responses may be treated as a single query response for present purposes. In some embodiments, the transformation interface implementation 214 transforms every query-satisfying item in the program's execution image, in other cases, only some items 216 are transformed because that is what the user specifically commanded.

In some embodiments, the memory of the instrumentation architecture contains an instrumentation context 230 for a current execution image 130. The instrumentation context may identify at least one query-satisfying function or other query-satisfying item 216 which has not been executed during the current execution. Thus, instrumentation with the present architecture is not necessarily limited to items lying within a current execution path, unlike some (if not all) debugger instrumentation approaches.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, target program 120 may be running on one or more devices/systems 102 in a networked cloud, after being loaded from pre-execution image(s) 128 stored on yet other devices within the cloud, and the instrumentation context may be sent to an analysis/debugging architecture whose instrumentation API 202 is running on yet another cloud device/system 102.

Processes

Figure 3:
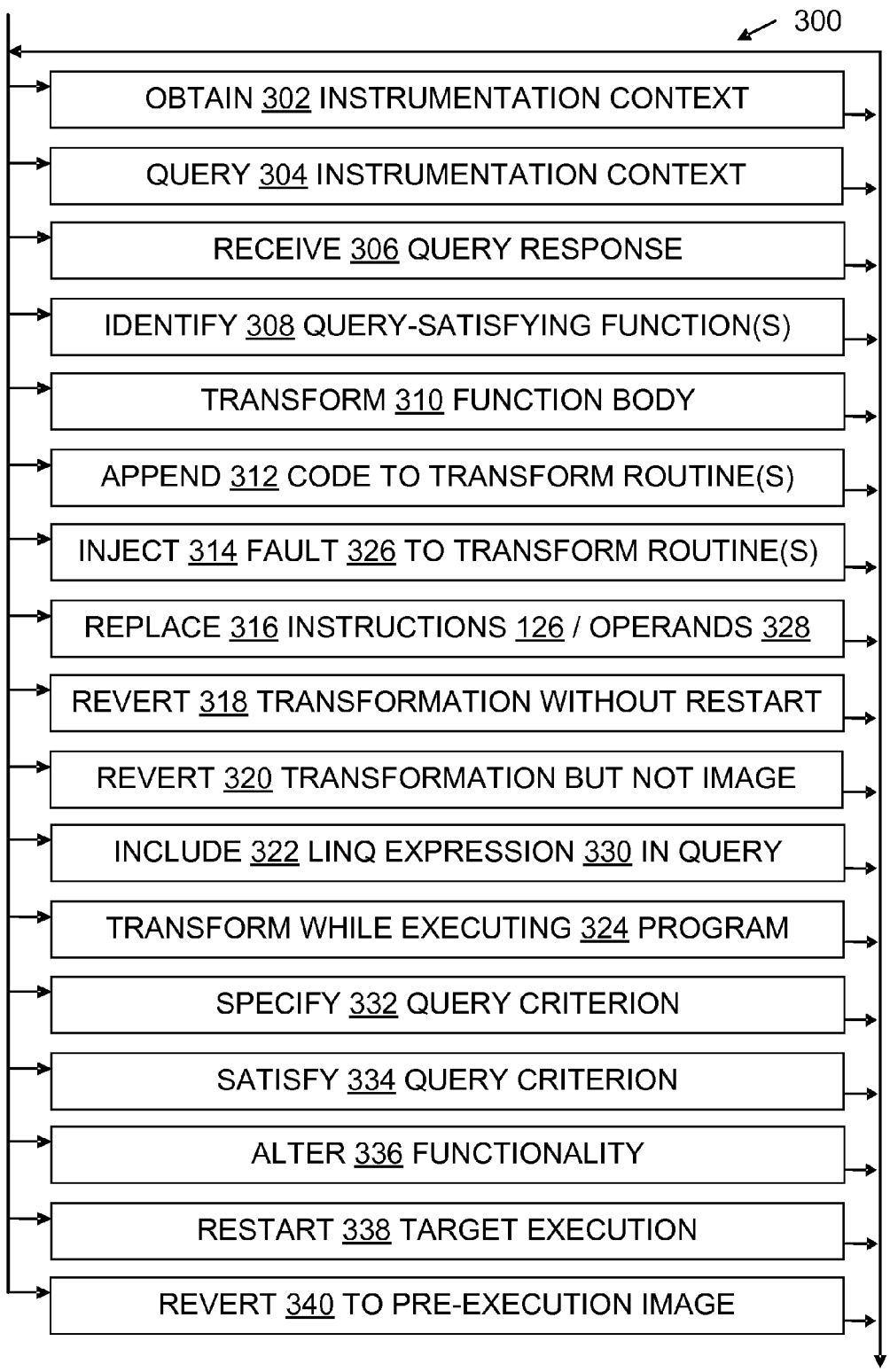
FIG. 3 is a flow chart illustrating steps of some process and configured storage medium embodiments.

FIG. 3 illustrates some process embodiments in a flowchart 300. Technical processes shown in the Figures or otherwise disclosed may be performed in some embodiments automatically, e.g., by an analysis program whose instrumentation API 202 is directed under the control of a script or otherwise requires little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments facilitate instrumentation of a target software program 120 during an execution 324 of the software program. Target program execution 324 is performed by a machine having a processor 110 and a memory 112 in operable communication with the processor. The target software program has a digital execution image 130 which is being executed by the machine along an execution path. The target software program also has a pre-execution image 128 which is stored in a computer-readable storage location apart from the execution image. For example, the pre-execution image 128 may be stored on disk 112 in a filesystem controlled by a developer 104, whereas the execution image 130 is stored in RAM 112. One of skill will recognize that pages of RAM may also be stored from time to time on another portion of the same disk or another disk, which is controlled by a virtual memory manager 144.

One of skill will also recognize that an analysis program, such as one running an instrumentation API 202, will have its own pre-execution image and its own execution image, but to reduce confusion all references herein to an image 128, 130 are to the target program's image unless otherwise stated. The possibility of overlapping roles will also be recognized; an analysis program may itself be the target of yet another analysis program, and so on. Although a chain of such related programs is possible, for clarity the examples presented herein primarily use a single target program 120 which is being queried and transformed at runtime by a single analysis program 402.

Some embodiments obtain 302 in the machine memory 112 an instrumentation context 230 for the target software program's execution image 130. Obtaining 302 the context includes the machine executing at least one high-level programming language statement 206 of the analysis program.

In some embodiments, the instrumentation context 230 includes a set of function identifications 228 which identify 308 at least one function from the execution image which is in the execution path and also identify 308 at least one other function from the execution image which is not in the execution path 226. As elsewhere herein, "functions" means routines generally, not merely those which return a value on the stack.

Some embodiments query 304 the instrumentation context using a high-level programming language query 234 which specifies 332 at least one query criterion 218 to be satisfied. For example, having the function name conform to a specified regular expression or belong to a specified module may be given as a query criterion in some embodiments. Having the function contain a particular specified instruction, or having the identified item 216 be that specified instruction, may be given as a query criterion 218 in some embodiments. A query criterion 218 may be a Boolean combination of constituent query criteria 218. In some embodiments, the query includes 322 a declarative Language Integrated Query expression 330. Other examples of query criteria are also provided herein, and other possibilities will also be apparent to those of skill in view of the teachings presented herein.

Some embodiments receive 306 in the machine memory 112 a query response 232 which identifies 308 one or more functions and/or other items 216 in the target program's execution image 130 that satisfy 334 the query. In some cases, the query response identifies 308 every item in the program's execution image that satisfies the query, while in other cases only a proper subset of those items is identified 308. In some embodiments, functions and low-level instructions may be identified 308 as satisfying the query regardless of whether those items have executed 324 yet during the current execution of the program 120. In some embodiments, the query-satisfying item 216 includes a bytecode instruction 126, a Common Intermediate Language instruction 126, or a low-level virtual machine instruction 126, for example.

Some embodiments transform 310 a function body 224 of at least one query-satisfying function 220 in the program's execution image 130, and some do the transformation without thereby modifying the program's pre-execution image 128.

Some embodiments transform 310 at least one query-satisfying item 216 in the program's execution image in a manner that alters 336 a functionality aspect of the execution image. That is, execution of the transformed item provides different functionality than would be provided by execution of the item without first transforming the item. Sometimes every query-satisfying item in the program's execution image is transformed 310, while in other cases only some of the query-satisfying items are transformed.

To perform a transformation, some embodiments append 312 code at the beginning of at least one query-satisfying function, some append 312 code at the end of at least one query-satisfying function, and some inject 314 a fault 326 into at least one query-satisfying function.

Some embodiments replace 316 at most N individual instructions 126 of the query-satisfying function 220 without replacing the entire function (where N=1, 2, 3, 4, 5, or another predetermined value). Some replace 316 one or more operands 328 of at most N individual instructions of the query-satisfying function without replacing the entire function. Some embodiments replace 316 an individual low-level instruction 126 without replacing any adjacent low-level instruction and without replacing any operand of any adjacent low-level instruction. Some replace 316 at least one operand 328 of an individual low-level instruction without replacing any adjacent low-level instruction and without replacing any operand of any adjacent low-level instruction.

Some embodiments revert 318 transformation of at least one query-satisfying function 220 without restarting 338 execution of the target software program 120. Some revert 320 transformation of at least one query-satisfying function without reverting 340 the program's execution image 130 to the program's pre-execution image 128. Some do both—they revert 318 the transformation without restarting 338 execution and also revert 320 the transformation without reverting 340 to the pre-execution image.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as an instrumentation API 202 or an instrumentation context 230, in the form of data 118 and instructions 116, read from a removable medium 114 and/or another source such as a network connection, to form a configured medium. The configured medium 112 is capable of causing a computer system to perform technical process steps for revertable execution-time program instrumentation as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from documentation for a Microsoft Corporation project whose design specification document is titled "Dynamic Code Instrumentation for Managed Applications." Aspects of the project and/or the documentation are consistent with or otherwise illustrate aspects of the embodiments described herein. However, it will be understood that the project's documentation and/or implementation choices do not necessarily constrain the scope of such embodiments, and likewise that the project and/or its documentation may well contain features that lie outside the scope of various embodiments described herein. It will also be understood that the discussion below is provided in part as an aid to readers who are not necessarily of ordinary skill in the art, and thus may contain and/or omit details whose recitation below is not strictly required to support the present disclosure.

This project aims to be a universal managed-code instrumentation framework enabling scenarios where it is useful to modify a running in-memory external managed applications. By "instrumenting" code, one means replacing parts of its functionality with custom external code without killing the application's process, recompiling its source code, or even having access to its source code. Intended users of this framework include, for example, software developers that are familiar with the C# programming language.

This project aims to enable scenarios illustrated by the following code snippets. These are only some example scenarios; a given embodiment is not necessarily capable of supporting a given scenario, and other scenarios not spelled out below will also be apparent to those of skill in the art.

Code Coverage/Block-Level Tracing.
```
InstrumentationContext ctx=new InstrumentationContext
("app.exe")
var basicBlock=from func in ctx.Functions
    from block in func.BasicBlocks
    where func.Module !="mscorlib.dll" &&
    func.Module !="system.dll" &&
    func.ReturnType==typeof(DateTime)
    select block;
basicBlocks.AppendPrefix((blockUid)=>
    Console.WriteLine("I'm executing block #{0}", blockUid"));
ctx.Run( );
```

The snippet above iterates over all basic blocks in all functions in the instrumented target application ("app.exe" and all its statically referenced modules) that are not part of mscorlib.dll or system.dll and appends 312 code at their beginning. The framework will compile the lambda expression used as a parameter to Append Prefix to Microsoft Intermediate Language (MSIL) and modify the original functions in app.exe before they're JITted (just-in-time compiled). After running app.exe with this instrumentation enabled, each basic block will write its uniquely assigned id to the console whenever it's executed.

This scenario, while significantly slowing down app.exe's execution, enables very detailed tracing and code coverage that can be very helpful in cases like: investigating failed test-cases, a tool for customer-support engineers 104 that enables quick, production systems diagnostics, finding test-coverage statistics, and identifying hot-spots.

Fault Injection

```
InstrumentationContext ctx=new InstrumentationContext
("app.exe");
var instructions=from func in ctx.Functions
    from instr in func.Instructions
    where instr.Category==Instruction Category.Conditional-
Branch &&
        func.Name=="IsProxyServerAvailable" &&
        func.ContainingType==typeof(ProxyValidator)
    select instr;
ConditionalBranches.Invert(instructions);
ctx.Run( );
    or
InstrumentationContext ctx=new InstrumentationContext
("app.exe");
var property=from type in ctx. Types
    from property in type.Properties
    where type.Type==typeof(Environment) &&
    property.Name=="ProcessorCount"
    select property;
property.ReplaceGetter(( )=>{return 1000; });
ctx.Run( );
```

The first fault injection 314 code snippet above iterates over all MSIL instructions that are in the body of functions named IsProxyServerAvailable contained in type ProxyValidator and selects instructions that fall into the Conditional-Statements category (such as blt, bgt, brtrue, brfalse, bge, and so on) and replaces them with their opposites.

This can be very useful when trying to simulate a certain state that is hard to achieve, such as a proxy server going down after being identified as available, but before a request to it is issued, or simulating how a certain concurrent algorithm divides its work on a 100 core machine without having a 100 core machine. Or if DateTime.Now returns Sep. 3, 1982. Many other use cases are also possible.

Threading Analysis

```
InstrumentationContext ctx=new InstrumentationContext
("app.exe");
ctx.OnThreadStarted+=EventHandler1;
ctx.OnThreadSuspended+=EventHandler2;
ctx.OnThreadDestroyed+=EventHandler3;
ctx.Run( );
```

This example code can give a developer 104 insight into thread creation frequency, thread lifetime characteristics, or what causes a thread to get destroyed.

Additional planned scenarios are illustrated by the following code snippets. Assume that app.exe is a managed Microsoft®.NET application (marks of Microsoft Corporation) which implements a function called MyFunction1.

```
1. InstrumentationContext ctx=new InstrumentationContext
("app.exe");
    var function=from func in ctx.Functions
    where func.Name=="MyFunction1"
    select func; // LINQ syntax
    ctx.CreateTransform(function).ReplaceBodyWith(
    ( )=>MessageBox.Show("Replaced")).Apply( );
    ctx.Run( );
2. InstrumentationContext ctx=new InstrumentationContext
("app.exe");
    // method-call syntax:
    var function=ctx.Functions.Where(func=>func.Name==
        "MyFunction1");
    var transform=ctx.CreateTransform(function).Replace-
BodyWith( ( )=>{throw new InvalidOperationExcep-
tion( ); });
    ctx.Run( );
// . . . then after some time:
transform. Revert( )
3. InstrumentationContext ctx=new InstrumentationContext
("app.exe");
    var function=from func in ctx.Functions
    where func. Name=="MyFunction1"
    select func;
    var transform=ctx.CreateTransform(function).Replace-
BodyWith(
    ( )=>{return new InvalidStateObject( ); }).Apply( );
    ctx.Run( );
// . . . then after some time:
transform.Revert( );
    var transform2=ctx.CreateTransform(function).Replace-
BodyWith(
    ( )=>{MessageBox.Show("Replaced again!"); return
null; });
    transform2.Apply( );
```

Some Building Blocks

There are multiple ways in which this instrumentation framework could be implemented. One particular implementation uses two technologies: a native profiling API and managed C#. Before drilling down to implementation details, consider what may be done to instrument and replace a method's body in a running application. From previous code snippets, one can identify two operations in the use cases: the operation of identifying what is to be instrumented (what) and the operation of specifying the instrumentation that to perform on the selected item (how).

Item 216 identification for a method, an instruction, a type, metadata, a statement, or a basic block as the item, can be performed by writing a LINQ query 234 against an instance 230 of InstrumentationContext. This query specifies 332 the type of target to modify and what criteria this item has to satisfy 334 in order to qualify for instrumentation.

To support LINQ-based criteria specifications, one may implement a custom IQueryProvider that will transform the used LINQ Expression tree 330 into more efficient and meaningful representation that can be used by the native instrumenting code that will evaluate, during the target application's runtime, whether a certain object qualifies for being instrumented. The transformed expression tree should meet certain criteria. It should be self-contained—it will be evaluated in a different process with a different address space and on a different runtime platform. It should be serializable to a contiguous buffer—it will be sent to a native application through interprocess communication (IPC). It should be very efficient—it will be run and evaluated against every function in the instrumented application 120. This may amount to hundreds or thousands of evaluations per minute.

Before turning in depth to the query evaluation and transformation, consider how the native Common Language Runtime (CLR) profiling API can be used and what functionality it provides. This helps explain some design decisions on the IQueryProvider side.

Instrumentation Workflow

Figure 4:
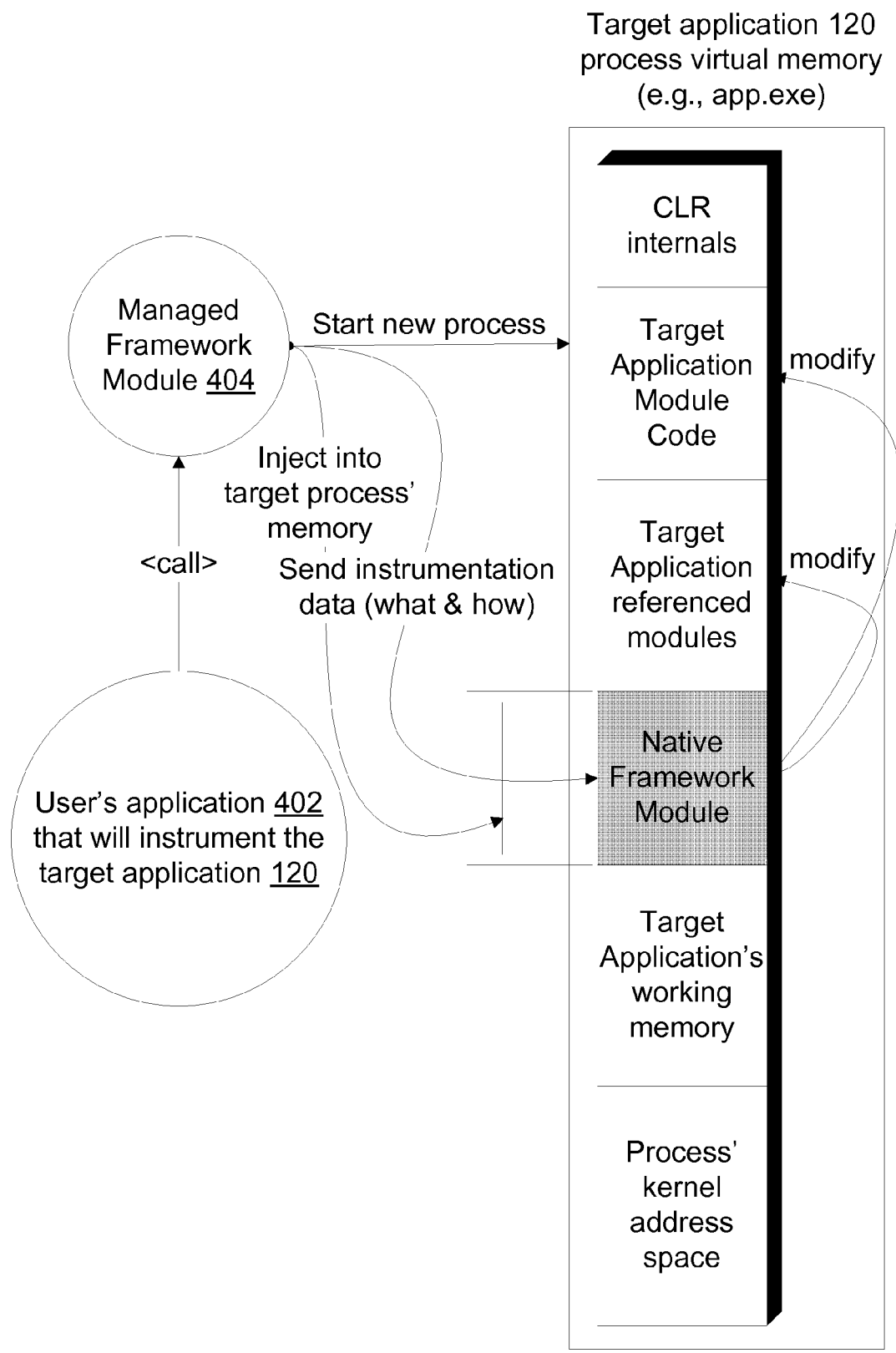
FIG. 4 is a flow diagram illustrating aspects of instrumentation control flow in another example architecture.

With attention to FIG. 4, it will be recognized that this dynamic instrumentation framework includes two components: a managed library and a native library. The managed library 404 is responsible for exposing an API such as instrumentation API 202, for defining instrumentation criteria and actions. The native library interprets the defined criteria 218 and implements actions (query 304, transform 310, revert 318, 320) commanded in the analysis application 402. The native library is loaded in the same address space in the CLR process as the target application 120. The native library acts on the interpreted data by modifying the target application's function bodies in memory 112.

In this particular framework, a basic workflow proceeds as follows.

First (step one), instrumentation criteria and actions are defined by calling APIs 202, 208, 210 that are part of this framework. Queries 234 against an instance 230 of InstrumentationContext define what object 216 is to be instrumented. Each query returns an instance 232 of IInstrumentable<T> that holds data about the issued query and the type of objects targeted by that query. IIntrumentable<T> is used to create a transform context for the target object's type, e.g., by calling IntrumentationContext.CreateTransform( ) in the case of this iteration, where only function body replacement is supported. In one version, FunctionTransformContext is the only implemented transform context type. FunctionTransformContext exposes a public method called ReplaceBodyWith that accepts function pointers or closures.

Second, this framework will start the target application 120 and will load the native component into target application's process.

Third, the managed component will send all data specified by the user in step one to the native component that is already running in the same address space as the target application.

Fourth, the native component will interpret what step three sent and will modify the target's application code 222 in memory.

Fifth, the target application will run functions 220 with modified bodies 224 when it calls them.

CLR Native Profiling API

This API (which may be implemented as part of an instrumentation API 202) enables a managed application to be loaded with profiling support exposing a that the consumer of this API could subscribe to. To consume this API a native module exposes its implementation of ICorProfilerCallback COM interface through IClassFactory. The CLR will pick up this implemented interface, and load it within the same process as the managed target application 120, then call its implementation of Initialize( ) method passing an instance of ICorProfilerInfo as a parameter. The profiling callback interface configures the profiling session through a call to ICorProfilerInfo::SetEventMask, in which it specifies what kind of notifications it is interested in, which profiling features it wants the CLR to enable and what special settings it wants the target application to run under. That information is configured through setting appropriate masks in the COR_PRF_MONITOR enumeration.

Among all available options, several that are particularly interesting for this framework are discussed below.

COR_PRF_DISABLE_OPTIMIZATIONS flag. This flag disables code optimizations. This flag is set to prevent significant changes to the original code. While a method's exact layout and code do not affect the scenarios in some versions which focus on replacing method bodies without going into details about their internal MSIL code, other versions support instruction-level transformations. COR_PRF_DISABLE_ALL_NGEN_IMAGES flag. This flag disables loading precompiled assemblies. Without this flag, the CLR will not give notice of compilation events that happen to functions in modules that were NGEN-ed. Some versions try to detect if the instrumented functions are in NGEN-ed images and only then set this flag; this will improve performance.

COR_PRF_MONITOR_JIT_COMPILATIONS flag. When this flag is set, the CLR will notify a version of the framework when it is about to compile a method from MSIL code to target machine's-specific machine code. Every function that is about to be compiled (JIT-ted) will trigger ICorProfilerCallback::JITCompilationStarted. In this method the framework will replace function's MSIL bodies through a call to ICorProfilerInfo::SetILFunctionBody.

COR_PRF_MONITOR_MODULE_LOADS flag. Setting this flag will enable ICorProfilerCallback::ModuleLoadStarted and ICorProfilerCallback::ModuleLoadFinished callback functions to be called whenever the target application loads a module (either dynamically through Assembly.Load, or by loading a type from a compile-time statically referenced module). These notifications can be used by a framework to figure out if the framework is instrumenting anything in the loaded module; if nothing is instrumented in the loaded module, any subsequent function loads from this module will not trigger any actions on the framework's native side (except perhaps event query evaluation), which will greatly improve performance.

COR_PRF_ENABLE_REJIT flag. This flag supports the scenario of reverting and re-instrumenting a given function after it was once instrumented or the scenario of instrumenting a function that was already JIT-ted. With this flag set, one will have the option to call ICorProfilerInfo4::RequestRevert to revert a function to its original form or ICorProfilerInfo4::RequestReJIT. After such call is issued, the CLR will trigger ICorProfilerCallback4::ReJITCompilationStarted whenever the re-JITted function will be need to be compiled again before it's called by some code.

After setting the COR_PRF_MONITOR mask as mentioned, the CLR will run the target managed application. Every time the target application will call a function it will compile it first from its MSIL representation to machine's-specific machine language 126; only then can its code be executed. Before compiling it to machine code, the CLR will call an implementation of ICorProfilerCallback::JITCompilationStarted passing the runtime FunctionID of the function it is just about to compile. In this call one version calls ICorProfilerInfo::SetILFunctionBody that will tell the CLR that one wants it to replace a certain function with one's own MSIL code. ICorProfilerInfo::SetILFunctionBody accepts three transformation 310 parameters. A ModuleID parameter is the runtime-identifier for the module that contains the function that one wants to replace. An mdMethodDef token parameter is the module-relative token of the function one wants to replace. A void* Buffer parameter is a pointer to a buffer previously allocated with special flags and permissions that are described elsewhere in this document. This buffer contains data formatted according to the IMAGE_COR_IL-METHOD data structure (corhdr.h) that has information about the new function's properties such as stack size, code size, any additional sections (such as exception handling sections), the actual MSIL body, any relevant flags, and so on. This buffer's structure and more details about intermediate language (IL) rewriting is covered elsewhere in this document.

After a successful call, to ICorProfilerInfo::SetILFunctionBody, one unblocks and returns from ICorProfilerCallback::JITCompilationStarted. The CLR will pick up the custom function implementation rather that what is defined in the target application during the JIT phase and call that transformed 310 function body whenever anything calls the instrumented function.

Query Processing

Although this instrumentation framework mainly modifies MSIL instructions at method level, it allows method selection criteria to select methods at many levels. More generally, an embodiment may specify 332 query criteria 218 such as the following: all methods named_regexp_where_regexp_represents a literal string or another regular expression that defines a collection of one or more strings; all methods in class Named_regexp_; all methods in classes that implement "ISomeInterface" where ISomeInterface is some interface name provided by the user 104; methods that return values of type "Def" and have "Validate" in their name; methods are implemented in module "123.dll" where 123.dll is some file or library name provided by the user 104; instructions that are of type "callvirt" and call a particular function; methods that reference a certain string/object in the .DATA section of its module (to instrument all functions that show a particular error string).

To enable efficient query evaluation on the native profiling API side, in some versions queries 234 are transformed to a format that is easy to execute and maps to the structure of that API. For example, in some versions any LINQ query is transformed to a collection of sub queries, depending on what kind of criteria it specifies. Sub queries are categorized into the following hierarchy:

Module—All parts of a query that evaluate properties of a module fall into this category. For instance if a query selects "functions that are contained in module abc.dll", there will be a sub query generated that will evaluate all loaded module if they meet the specified criterion.

Type—Here are placed all parts of a query that evaluate properties of a type that might contain target functions. Queries like "all functions implemented in typeof(DateTime)" will emit a sub query that falls into this category and it will look like this: Type name==System.DateTime.

Method—In this category are placed all parts of a query that evaluate properties of a function, such as: "all functions that end with 'Async'".

Basic Bloc—In this category are placed all parts of a query that specify a basic block, e.g., a loop or a conditional statement and its constituent branch statements.

Instruction—In this category are placed all parts of a query that specify an individual instruction 126.

For a certain method to be qualified for instrumentation according to a query, all sub queries in its level and levels higher in the hierarchy should evaluate to true. While processing a query, if a sub-query for a particular level evaluates to true, all methods within that level are deemed as qualified until a sub-query in a lower level will evaluate to false. This means that if one has a query that has only criteria on the Type level and that criteria evaluates to true for a certain type, all its methods qualify for being instrumented, or if there is a module that passes the checks all methods within that module are considered as "selected" until a sub-query lower in the hierarchy will evaluate to false. If a query has criteria specified for a certain level, a default criterion is augmented by the framework that always returns true for all levels higher in the hierarchy that do not have any criteria specified.

Here is an example that illustrates this logic: "I want methods that are implemented in module abc.dll and their return type is of type string". A corresponding collection of sub-queries looks like this: Module: Name=="abc.dll", Type: All (everything will evaluate to true), Method: its signature has string as a return type.

Evaluating this query will first narrow down functions to the ones that are implemented in "abc.dll", and at this stage all methods within this module are qualified. Then it will evaluate the next level—type. Type has an automatic augmented sub-query that will qualify all types. Until now still all methods within "abc.dll" are qualified. Then for each method it will evaluate the criterion specified for "Method" level and this will narrow down methods to the ones that return string. There are no criteria specified for BasicBlock or Instruction in this example, so all basic blocks and instructions within the methods that survived previous filters are qualified.

Having identified how to break down a query, here is a data structure that will hold such a query in a contiguous buffer:

```
struct CodeQuery
{
size_t QueryBlobSize;
unsigned char MaximumCriteriaLevel;
LevelCriteria Firstlevel;
};
```

In this CodeQuery data structure, QueryBlobSize holds the total size of this query in bytes. MaximumCriteriaLevel indicates the level of details the query specifies. Its value is the lowest level in the sub-queries hierarchy that has criteria to be evaluated before a function is selected. FirstLevel is a LevelCriteria data structure that specifies the criteria list for the first (highest in hierarchy) level. A LevelCriteria data structure looks like this:

```
struct LevelCriteria
{
unsigned int Criteria Count;
unsigned int EvaluationRequirements;
SingleCriterion FirstCriterion;
};
```

In this LevelCriteria data structure, CriteriaCount specifies how many criterions this level has. For example, if one is looking for "types that implement IValidator and their generic argument is of type int", one will have two criterions for a "Type" level. EvaluationRequirements is a bitmask that specifies what data are used to evaluate the whole criteria chain for this particular level. For example, to evaluate this query for a function: "Functions that return string, their name end with 'Info' and are setters" one would fetch data from multiple sources. Figuring out whether a method's name ends with "Info" uses a call to IMetaDataImport::GetMethodProps and the third output parameter. To find out if a method returns string one retrieves a pointer to its CCOR_SIGNATURE structure and to find out if it is a setter one calls IMetaDataImport::GetMethodSemantics and examines the returned bitmask. Knowing in advance the whole dataset that is used to evaluate every query in this level's chain will give the framework an opportunity to retrieve these data in batch in one operation in advance rather than retrieving them for every criterion, which will save a lot of resources because retrieving these data could be expensive (it involves querying COM for instances of IMetaDataImport and other metadata interfaces). This bitmask has different meaning for every evaluation level, as every level has different Metadata interfaces and different properties that could be evaluated. FirstCriterion is a data structure that has information about the first criterion that is evaluated in this chain.

Each criterion is treated as binary operator where the first operand is the evaluated object itself and the second operand is whatever data the operator expects:

```
struct SingleCriterion
{
unsigned int Operator;
union OperandValue
{
   size_t OperandSize;
   char OperandBlob[1];
} Operand;
};
```

A single criterion has two values: the operator that specifies what kind of evaluation is performed against the evaluated object and an operand blob that is specific to the used operator. Some examples of operators include: MethodName- Equals, MethodNameContains, MethodSemanticsHas, MethodSignatureEquals, TypeNameEquals, TypeGenericParamNameEquals. The operand value and semantics will depend on the type of the operator used. For example, for operators of type MethodNameEquals, the operand in its "OperandBlob" member will have a wchar_t array of size equals to OperandSize. If MethodSignarureEquals operator is used, the operand value will be of type CCOR_SIGNATURE and OperandSize will be equal to the signature length. On the other hand, if one is using MethodSemanticsHas operator, the OperandSize will not be used as the operand size is always constant.

To further illustrate how a query is transformed, here is a sample query:
var functions=from fn in InstrumentationContext.Functions
  where fn.Name.StartWith("Create") &&
    fn.ReturnType==typeof(IRequest) &&
    fn.Module.Name=="Module.dll"
  select fn;

This query will be transformed to the following CodeQuery:
CodeQuery
{
  QueryBlobSize: ###;
  MaximumCriteriaLevel: 3 (Method)
  Levels:
  (modules) [0]=>LevelCriteria
    {
      CriteriaCount=1;
      EvaluationRequirements=TOKEN_SZ_NAME;
      SingleCriterion[1]=>
        {
          Operator=ModuleNameEquals;
          OperandValue=>
            OperandValue
            {
              OperandSize: 10×sizeof(wchar_t);
              OperandBlob: ["module.dll"];
            }
        }
    }
  (type) [1]=>LevelCriteria
    {
      CriteriaCount=1;
      EvaluationRequirements=NONE;
      SingleCriterion[1]=>
        {
          Operator=PassAll;
          OperandValue: {OperandSize: 0; }
        }
    }
  (method) [0]=>LevelCriteria
    {
      CriteriaCount=2;
      EvaluationRequirements= TOKEN_SZ_NAME|SIGNATURE;
      SingleCriterion[1]=>
        {
          Operator=ModuleNameStartsWith;
          OperandValue=>
            OperandValue
            {
              OperandSize: 6×sizeof(wchar_t);
              OperandBlob: ["Create"];
            }
        }
      SingleCriterion[2]=>
        {
          Operator=SignatureIncludes;
          OperandValue=>
            OperandValue
            {
              OperandSize: 6
              OperandBlob: [ELEMENT_TYPE_BYREF, mdRefToken, 0x00]
            }
        }
    }
};

This CodeQuery is packed in a contiguous buffer and sent to the profiling module as discussed elsewhere herein.

Evaluating Queries at Runtime

The native instrumentation component maintains a list of all active queries. On every ICorProfilerCallback::ModuleLoadFinished, the profiler module will evaluate the loaded module against all active queries' level 0 criteria and store the result of that evaluation for further use. Additionally, it will evaluate every class in ICorProfilerCallback::ClassLoadFinished against all active queries' level 1 criteria that survived level 0's evaluation for that query. On every ICorProfilerCallBack::JITCompilationStarted event, it invokes ICorProfilerInfo::GetFunctionInfo and retrieves function's class token and module token. Then it will examine every active query's results for that module and type. If both the class and module survived previous filters it will invoke level 2's filters against the function itself. If all these level 2 filters are passed by a certain function then that function 220 qualifies for instrumentation and its body will be replaced or otherwise transformed 310 as described in this document. Some versions of this framework do not support instruction-level instrumentation, and sub-queries at levels 3 and 4 are ignored in some versions.

Instrumenting functions

One framework version only supports function body replacement as transformation 310. Regardless of whether other transformations 310 are supported, in some embodiments function bodies 224 are specified using lambda expressions, delegates, and/or anonymous delegates.

After defining a LINQ query, depending on the returned item's type, an appropriate overload of CreateTransform is picked up automatically from InstrumentationContext. In the case of a function-targeting instrumentation query, an appropriate CreateTransform overload may be FunctionTransformContext CreateTransform(IIntrumentableCollection<Function> target); which returns a transform context object. Transform context objects are objects that expose object-specific transformation operations; in the case of methods, they can expose the ReplaceBodyWith method, for instance.

When a statement like this is executed:
InstrumentationContext.CreateTransform(functions)
  .ReplaceBodyWith( ( )=>{/* . . . */});
the FunctionTransformContext will examine the executable code that was used with ReplaceBodyWith. Depending on its type (e.g., lambda expression, delegate, anonymous delegate or a method reference) it will either compile it and get its MSIL byte stream or with reflection decompile it and retrieve its static IL byte stream.

As part of replacing a target application's body with the new method, some versions make sure that all tokens referenced by the alternative method body are translated to appropriate mdRefToken-s relative to the target application.

In the CLR mdTokens are opaque 32-bit integers that reference things from the metadata tables in every assembly. For example if a function calls:

System.Console.WriteLine("Output to console stream.");
this will translate to the following MSIL code:
ldstr 0x7000001
call 0x0A00013

The first instruction will load a string into the evaluation stack. The string that is about to be loaded is placed in the compiled assembly's metadata table in the .DATA section and is assigned this identifier (mdRefToken) during compile-time. For this function to run on the target assembly, one makes sure that this string is present in target's metadata table and has a module-relative token assigned to it, otherwise it can't be referenced.

InstrumentationContext implements an MSIL decompiler class that can iterate over MSIL bytes stream and identify each instruction and its operand values. For each instruction that references tokens, it identifies what are those tokens. If any referenced token is a piece of static data (e.g., static string, other static resource) a copy of that resource is stored in a temporary buffer and the MSIL instruction's operand is then replaced with a temporary resource identifier. If any referenced token is referencing another function, type or any other CLR-recognized code type, the MSIL instruction's operand value also gets replaced by a temporary identifier pointing to an index in a collection that holds detailed information about that member reference, along with its containing type and module.

Function tokens are not used directly is because these tokens are of mdTokenRef type (unless they're calling methods from the same module). Referencing mdTokenRef means referencing a type from a referenced module. When a module is referenced, the compiler will generate a token that identifies that bond and will also generate a token for each used type and member from the referenced module. The compiler does that to avoid token collisions between mdTokens. These tokens are assigned in a sequentially incrementing manner with different highest-order bits depending on the type of the token and it is possible in theory for two modules to have the same tokens assigned to completely different types or members.

To reconstruct the argument used in ReplaceBodyWith in the instrumented application as a valid function body, Some versions make sure to also reconstruct all referenced members and static data. After identifying tokens, they are packed into a TokenReference structure:

```
struct TokenReference
{
unsigned int TokenType;
struct ReconstructableValue
{
  size_t Token Size;
  char TokenValue[1];
} Token Value;
};
```

In a TokenReference structure, TokenType defines what kind of token is imported. This value can be any of the following: mdTypeRef, mdMemberRef, mdModuleRef, mdAssemblyRef, mdString. TokenValue depends on what kind of token one is importing, and will have a value that permits importing the token to the target application. Importing tokens to the target application is done using calls to IMetaDataEmit interface instance.

Importing tokens may includes adding resources to the static data section, adding module references or finding existing module references that map to the ones identified in the MSIL code in the alternative method body and importing type and member references if they're not used before. IMetaDataEmit functions returns pointers to mdTokens that the CLR assigns during runtime to dynamically imported elements of the metadata tables.

Any variables referenced by closures passed to ReplaceBodyWith will be either evaluated at runtime by the instrumentation framework and their results passed as constant if a local variable is referenced, or else they will be passed as reference and the containing type imported into the target application if a reference is made to a publicly-visible member of a type. After importing these tokens, the temporary placeholders in the MSIL code are replaced with proper token values and the resulting MSIL body can safely be used as an alternative to the old function.

These TokenReference data are packed together into a contiguous buffer and sent along with CodeQuery to the instrumentation module.

Public API Contracts

In some versions, the only end-user instantiable type in this framework is InstrumentationContext. Users create one instance of this class per instrumented process. InstrumentationContext enables two main scenarios. First, defining instrumentation criteria by exposing properties for each kind of instrumentable objects. In some versions, it exposes only the Functions property. These properties under the covers implement IQueriable<T> and IQueryProvider<T> which lets it intercept LINQ queries as expression trees. The user-facing interface for these properties is IInstrumentable<T> where T is the class of instrumentable object. Second, creating code transforms for a defined query; each query returns an instance of IInstrumentable<T>. Depending on the type of T an appropriate instance of ITransform<T> is returned. Each specialization of ITransform<T> has methods specific to the target type. In case of functions, it has ReplaceBodyWith.

A framework's public types in some versions are: InstrumentationContext, ITransform<T>, FunctionTransform, IInstrumentable<T> and Function. Their relationships in some versions are the following. IInstrumentable<T> interface T:Class is derived from IEnumerable<T> interface and has attribute InstrumentationContext. InstrumentationContext has attribute function IInstrumentable<Function> and operations CreateTransform(IInstrumentable<T> target): ITransform<T>, CreateTransform(target:IInstrumentable<Function>):FunctionTransform, InstrumentationContext(string imageName), InstrumentationContext (ProcessStartInfo process), Launch Process( ) Process. InstrumentationContext instantiates ITransform<T> interface T:Class which has attributes CanRevert: bool, Context: InstrumentationContext, Target: IInstrumentable<T>, and operations Apply( ) void, Revert( ) void. InstrumentationContext instantiates FunctionTransform which has attributes CanRevert: bool, Context: InstrumentationContext, Target: IInstrumentable<T>, and operations Apply( ) void, replaceBodyWith(Action): void, ReplaceBodyWith<T1 . . . T17> (Func<T1 . . . T17>): void, ReplaceBodyWith<T1 . . . T16> (Func<T1 . . . T16>): void, Revert( ) void. InstrumentationContext instantiates Function which has attributes ContainingType: System.Type, CustomAttributes: IEnumerable<T>, FullName: string, Module: System.Reflection.Module, Name: string, Parameters: IEnumerable<ParameterInfo>, ReturnType: System.Type. InstrumentableQueryExtensions which has operation Where (this IInstrumentable<Function> source, Expression<Func<Function, bool>>criteria): IInstrumentable <Function> uses FunctionsQueryProvider which has operations CreateQuery(Expression expression): IQueryable<T> and Execute(Expression expression): T, which leads to BaseQueryProvider which has operations CreateQuery(Expression expression): IQueryable<T> and Execute(Expression expression): T which leads to IQueryProvider<T> interface T:Class which has operations CreateQuery(Expression expression): IQueryable<T> and Execute(Expression expression): T. BasicQueryProvider, FunctionsQueryProvider and InstrumentableQueryExtenstions are not publicly available—they are included to help show how LINQ support is implemented in some versions. Of course, other implementations are also possible consistent with the teachings provided herein. These and other interfaces described herein form part of an instrumentation API 202 in some embodiments.

As to InstrumentationContext, InstrumentationContext (string) creates a new instance of InstrumentationContext for a managed application located under the specified path. InstrumentationContext (ProcessStartInfo) creates a new context with more options set for the target application. FunctionTransform CreateTransform(IInstrumentable<Function>) returns a FunctionTransform instance for the query specified in the argument. Process LaunchProcess( ) starts the managed application with instrumentation enabled and returns an instance of Process class, enabling users to interact with their target application (like waiting for it, killing it, and so on). As to Property Functions: IInstrumentable<Function>, any LINQ query against this property will return a new instance of IInstrumentable<Function> specific to that query. These instances are then used to create transforms.

As to IInstrumentable<T>, this interface represents a query 234. Instances of this interface have significant internal state that is not publicly exposed to framework users 104. What the end-user can access in an instance of IInstrumentable<T> is the InstrumentationContext that this query belongs to. It also inherits from IEnumerable<T>. When the user attempts to iterate over an instance of this interface, the framework will lazily run the query against the target application and will iterate over results.

One aspect of this interface's "offline" mode (iterating over results of a query before launching the target application) is that the returned elements are only from statically referenced modules. Any results that could possibly be included in this query's result from dynamically referenced modules will not be accessible until the target application actually loads a module dynamically.

As to ITransform<T>, implementations of this interface help enable in-memory code modification. An instance of this interface could be obtained only through a call to InstrumentationContext.CreateTransform after preparing a query and passing it as a parameter as an IInstrumentable<T>. As to void Apply( ) this applies the transform to the target application. void Revert( ) reverts changes that were applied by Apply( ) and sets objects 216 affected by this transform to their original state. This is not always available. As to Properties, through CanRevert: bool implementations of this interface will specify if their modifications are revertible. Target: IInstrumentable<T> indicates the query that specifies what will be affected by this transform. Context: InstrumentationContext is the context that created this transform.

FunctionTransform is a specialization of ITransform and it is used to modify functions. In some versions, it implements the ReplaceBodyWith method that takes as an argument a function reference or a closure and uses its body as an alternative implementation. Changes made by this transform are revertible for target applications running under Microsoft®.NET Framework 4.5+ (mark of Microsoft Corporation).

Function. This class' main purpose is to enable easy querying. Queries could be written against its public properties like:
.Where(fn=>fn.ReturnType==typeof(int));
.Where(fn=>fn.ContainingType==typeof(MyClass));
.Where(fn=>fn.CustomAttributes.Contain(typeof(Serializable)));
.Where(fn=>fn.Name.EndsWith("Ex") && fn.Parameters [2].Type==typeof(bool));

When the user attempts to iterate over an IInstrumentable<Function>, the framework will populate instances of this class and return them as results of a query.

Some embodiments provide a process for a user to make changes to a software program during execution of the software program 120. The software program has a pre-execution image 128 and also has an execution image 130. The process includes the following steps which are each specified by one or more statements 206 in a high-level programming language 204: (a) obtaining 302 an instrumentation context 230 for the program's execution image, (b) querying 304 the instrumentation context using a query 234 which has query criteria 218, (c) receiving 306 a query response 232 which identifies all functions 220 in the program's execution image that satisfy the query criteria regardless of whether those functions have executed yet, and (d) transforming 310 those functions in the program's execution image without modifying the program's pre-execution image. In some embodiments, the pre-execution image 128 includes a signed assembly. However, teachings presented herein are also applied in some embodiments to unsigned assemblies.

In some embodiments, the query 234 includes a declarative Language Integrated Query. In some, the high-level programming language 204 is among the following: a programming language such as Java® variations and Microsoft®.NET languages which are derived from the C programming language and which gets compiled to an intermediate language, a programming language which compiles to bytecode (e.g., Java® language), a Common Language Infrastructure programming language. Java® is mark of Oracle America, Inc. Microsoft® and .NET are marks of Microsoft Corporation.

In some embodiments, transforming 310 functions in the program's execution image includes at least one of the following: appending code at the beginning of each function, appending code at the end of each function, injecting a fault in at least one of the functions, replacing the body of each function, modifying individual existing instructions within one function by replacing an instruction or its operands while keeping the rest of the function unmodified.

In some embodiments, the process includes reverting 318 the functions (undoing the transforming step) without restarting execution of the software program. In some embodiments, the process includes reverting 320 the functions (undoing the transforming step) without reverting the program's execution image to match the program's pre-execution image.

In some embodiments, the user is a human user such as a developer or test engineer. In others, the user is a computational process such as an application program, script, or testing software. In some embodiments, the execution image executes in a managed code environment and the user is another program running in the same managed code environment, where in this instance "environment" means "runtime engine" such as the familiar Common Language Runtime (CLR). In other situations, the targeted (modified) image is not necessarily running under the same environment—it can run on a different machine under a similar runtime engine and the modification/instrumentation description could be sent over a network connection, for example.

Some embodiments provide variations on the foregoing, in that the query 234 response identifies 308 MSIL instructions (or bytecode instructions, or other low-level virtual machine instructions) and the transformation 310 applies to those instructions, rather than to functions per se. In some embodiments, an API 202 provides methods to obtain 302 an instrumentation context, to query 304 the instrumentation context, and to transform 310 functions or instructions that satisfy the query.

Some embodiments provide the technical advantage of supporting instrumentation of running code 120 without requiring a developer to have knowledge of the calling convention used in the compiled running code 120. Some allow the developer to instrument the whole program 120 regardless of whether the item 216 being instrumented is in the execution path 226, unlike debugger commands or MSIL-level analysis or reverse-engineered assembly instrumentation. Some embodiments work on legacy code. Some provide instrumentation at the granularity of individual functions, or even individual instructions 126. Some embodiments can be used in cloud data centers to identify problems and replace suspect parts without violating Service Level Agreements.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An instrumentation process for making changes to a software program during an execution of the software program by a machine having a processor and a memory in operable communication with the processor, the software program having a digital execution image which is being executed by the machine along an execution path during a current execution, the software program also having a pre-execution image which is stored in a computer-readable storage location apart from the execution image, the process comprising the steps of:

obtaining in the machine memory an instrumentation context for the software program's execution image, wherein the obtaining step includes the machine executing at least one high-level programming language statement, and wherein the instrumentation context includes a set of function identifications which identify at least one function from the execution image which is in the execution path and also identify at least one other function from the execution image which is not in the execution path;

querying the instrumentation context using a high-level programming language query which specifies at least one query criterion to be satisfied;

receiving in the machine memory a query response which identifies one or more functions in the program's execution image that satisfy the query regardless of whether those functions have executed yet during the current execution of the program, the one or more identified functions referred to here as query-satisfying functions; and transforming a function body of at least one of query-satisfying functions in the program's execution image without thereby modifying the program's pre-execution image.

2. The instrumentation process of claim 1, wherein the transforming step comprises at least one of the following: appending code at the beginning of at least one query-satisfying function, appending code at the end of at least one query-satisfying function.

3. The instrumentation process of claim 1, wherein the transforming step comprises injecting a fault in at least one query-satisfying function.

4. The instrumentation process of claim 1, wherein the transforming step comprises at least one of the following for each of at least one query-satisfying function: replacing at most three individual instructions of the query-satisfying function without replacing the entire function, replacing one or more operands of at most three individual instructions of the query-satisfying function without replacing the entire function.

5. The instrumentation process of claim 1, further comprising reverting transformation of at least one query-satisfying function without restarting execution of the software program.

6. The instrumentation process of claim 1, further comprising reverting transformation of at least one query-satisfying function without reverting the program's execution image to the program's pre-execution image.

7. A computer-readable storage medium configured with data and with instructions that when executed by at least one processor causes the processor(s) to perform a technical process for instrumentation of an execution image of a software program while the software program is being executed along an execution path during a current execution, the software program also having a pre-execution image which is stored apart from the execution image, the process comprising the steps of:
    obtaining in a machine memory accessible to the processor(s) an instrumentation context for the software program's execution image, the instrumentation context including item identifications which identify items from the execution image which include at least one item from the execution image which is in the execution path and also include at least one other item from the execution image which is not in the execution path;
    querying the instrumentation context using instructions compiled from a query specified in a high-level programming language, the query specifying at least one query criterion to be satisfied;
    receiving in the machine memory a query response which identifies at least one item in the program's execution image that satisfies the query, including at least one identified item which has not yet executed during the current execution of the program, the identified item(s) referred to here as query-satisfying item(s), the query-satisfying item(s) including at least one of the following: a query-satisfying function, a query-satisfying low-level instruction; and
    transforming at least one query-satisfying item in the program's execution image, thereby altering a functionality aspect of the execution image, namely, execution of the transformed item provides different functionality than would be provided by execution of the item without transforming the item, and wherein the transforming step is accomplished without modifying the program's pre-execution image.

8. The computer-readable storage medium of claim 7, wherein the transforming step comprises at least one of the following:
    appending code at the beginning of at least one query-satisfying function;
    appending code at the end of at least one query-satisfying function;
    injecting a fault in at least one query-satisfying function;
    replacing an individual low-level instruction without replacing any adjacent low-level instruction and without replacing any operand of any adjacent low-level instruction;
    replacing at least one operand of an individual low-level instruction without replacing any adjacent low-level instruction and without replacing any operand of any adjacent low-level instruction.

9. The computer-readable storage medium of claim 7, wherein the process further comprises at least one of the following:
    reverting transformation of at least one query-satisfying item without restarting execution of the software program;
    reverting transformation of at least one query-satisfying item without reverting the program's execution image to the program's pre-execution image.

10. The computer-readable storage medium of claim 7, wherein the query-satisfying item comprises at least one of the following:
    a bytecode instruction;
    a Common Intermediate Language instruction;
    a low-level virtual machine instruction.

11. The computer-readable storage medium of claim 7, wherein the query includes a declarative Language Integrated Query expression.

12. The computer-readable storage medium of claim 7, wherein at least one of the following conditions occurs:
    the receiving step receives a query response which identifies every item in the program's execution image that satisfies the query;
    the transforming step transforms every query-satisfying item in the program's execution image.

13. An instrumentation computer system comprising:
    a logical processor;
    a memory in operable communication with the logical processor;
    a current execution image of a software program, namely, an image of the software program as the software program is being executed by the instrumentation computer system during a current execution along an execution path, the software program also having a pre-execution image;
    an instrumentation application program interface ("instrumentation API") residing in the memory of the instrumentation computer system and directly accessible in a high-level programming language, the instrumentation API having constituent interfaces which include a query interface and a transformation interface;
    a query interface implementation having code which upon execution will identify query-satisfying items in the execution image which include at least one item in the execution image which is in the execution path and also include at least one other item in the execution image which is not in the execution path, namely, items in the execution image which satisfy query criteria set forth in an invocation of the query interface regardless of whether such items have been executed during the current execution; and a transformation interface implementation having code which upon execution will transform an item identified by the query interface implementation, thereby altering functionality of the current execution image in that execution of the transformed item provides different functionality than the functionality that would be provided by execution of the item without transforming the item, and wherein the item is transformed without modifying the pre-execution image.

14. The instrumentation computer system of claim 13, wherein the pre-execution image includes a signed assembly.

15. The instrumentation computer system of claim 13, wherein the high-level programming language is among the following: a programming language which compiles to bytecode, a Common Language Infrastructure programming language, a programming language which is not compiled directly to native processor instructions.

16. The instrumentation computer system of claim 13, wherein the execution image comprises managed code.

17. The instrumentation computer system of claim 13, wherein the transformation interface implementation includes code which upon execution will do at least one of the following:
- append code at the beginning of at least one query-satisfying function of the execution image;
- append code at the end of at least one query-satisfying function of the execution image;
- inject a fault in at least one query-satisfying function of the execution image;
- replace an individual low-level instruction of the execution image without replacing any adjacent low-level instruction and without replacing any operand of any adjacent low-level instruction;
- replace at least one operand of an individual low-level instruction of the execution image without replacing any adjacent low-level instruction and without replacing any operand of any adjacent low-level instruction.

18. The instrumentation computer system of claim 13, wherein at least one of the following conditions occurs:
- transformation interface implementation code reverts transformation of at least one query-satisfying item without restarting execution of the software program;
- transformation interface implementation code reverts transformation of at least one query-satisfying item without reverting the program's execution image to the program's pre-execution image.

19. The instrumentation computer system of claim 13, wherein at least one of the following conditions occurs:
- the memory of the instrumentation computer system contains a query response which identifies every item in the program's execution image that satisfies the query criteria;
- transformation interface implementation code transforms every query-satisfying item in the program's execution image.

20. The instrumentation computer system of claim 13, wherein the memory of the instrumentation computer system contains an instrumentation context for the current execution image, and the instrumentation context identifies at least one query-satisfying function which has not been executed during the current execution.

* * * * *